(12) United States Patent
Schaffner

(10) Patent No.: US 10,560,610 B2
(45) Date of Patent: Feb. 11, 2020

(54) METHOD OF SYNCHRONIZING MULTIPLE VEHICULAR CAMERAS WITH AN ECU

(71) Applicant: MAGNA ELECTRONICS INC., Auburn Hills, MI (US)

(72) Inventor: Michael Schaffner, Gross-Gerau (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/234,766

(22) Filed: Dec. 28, 2018

(65) Prior Publication Data

US 2019/0158706 A1    May 23, 2019

Related U.S. Application Data

(63) Continuation of application No. 15/911,442, filed on Mar. 5, 2018, now Pat. No. 10,171,709, which is a continuation of application No. 15/338,781, filed on Oct. 31, 2016, now Pat. No. 9,912,841, which is a continuation of application No. 14/097,581, filed on Dec. 5, 2013, now Pat. No. 9,481,301.

(60) Provisional application No. 61/733,598, filed on Dec. 5, 2012.

(51) Int. Cl.
| | | |
|---|---|---|
| H04N 5/04 | (2006.01) | |
| B60R 1/00 | (2006.01) | |
| H04N 7/18 | (2006.01) | |
| H04N 5/232 | (2006.01) | |
| H04N 5/225 | (2006.01) | |
| G06K 9/00 | (2006.01) | |
| H04N 5/247 | (2006.01) | |
| H04N 5/374 | (2011.01) | |

(52) U.S. Cl.
CPC ............. *H04N 5/04* (2013.01); *B60R 1/00* (2013.01); *G06K 9/00805* (2013.01); *H04N 5/2258* (2013.01); *H04N 5/23206* (2013.01); *H04N 5/23238* (2013.01); *H04N 5/247* (2013.01); *H04N 5/374* (2013.01); *H04N 7/181* (2013.01); *B60R 2300/00* (2013.01); *B60R 2300/105* (2013.01); *B60R 2300/607* (2013.01)

(58) Field of Classification Search
None
See application file for complete search history.

(56) References Cited

U.S. PATENT DOCUMENTS

| | | |
|---|---|---|
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |

(Continued)

*Primary Examiner* — Talha M Nawaz
(74) *Attorney, Agent, or Firm* — Honigman LLP

(57) ABSTRACT

A method of synchronizing cameras with an electronic control unit (ECU) of a vehicular vision system includes providing camera control signals to the cameras from the ECU via respective links from the ECU to the cameras, with the camera control signals regulating timing of the respective camera to be synchronous with reference timing of the ECU. The timing regulation of the cameras includes starting the camera synchronous to the ECU reference timing and holding the camera synchronous to the ECU reference timing. Image data is captured with each camera and provided to the ECU via the respective link. Image data captured by at least one of the cameras may be processed to detect an object present exterior of the vehicle.

34 Claims, 9 Drawing Sheets

(56) References Cited

U.S. PATENT DOCUMENTS

| | | |
|---|---|---|
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,144,022 A | 11/2000 | Tenenbaum et al. |
| 6,175,300 B1 | 1/2001 | Kendrick |
| 6,178,034 B1 | 1/2001 | Allemand et al. |
| 6,201,642 B1 | 3/2001 | Bos et al. |
| 6,202,164 B1 | 3/2001 | Gulick |
| 6,223,114 B1 | 4/2001 | Boros et al. |
| 6,227,689 B1 | 5/2001 | Miller |
| 6,266,082 B1 | 7/2001 | Yonezawa et al. |
| 6,266,442 B1 | 7/2001 | Laumeyer et al. |
| 6,279,058 B1 | 8/2001 | Gulick |

(56) References Cited

U.S. PATENT DOCUMENTS

| | | |
|---|---|---|
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 6,989,736 B2 | 1/2006 | Berberich et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,365,769 B1 | 4/2008 | Mager |
| 7,460,951 B2 | 12/2008 | Altan |
| 7,490,007 B2 | 2/2009 | Taylor et al. |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 8,013,780 B2 | 9/2011 | Lynam et al. |
| 8,027,029 B2 | 9/2011 | Lu et al. |
| 8,849,495 B2 | 9/2014 | Chundrlik, Jr. et al. |
| 9,227,568 B1 * | 1/2016 | Hubbell ............... B60R 1/081 |
| 9,387,813 B1 * | 7/2016 | Moeller ............... B60R 11/04 |
| 9,481,301 B2 | 11/2016 | Schaffner |
| 9,912,841 B2 | 3/2018 | Schaffner |
| 10,171,709 B2 | 1/2019 | Schaffner |
| 2002/0015153 A1 | 2/2002 | Downs |
| 2002/0113873 A1 | 8/2002 | Williams |
| 2003/0081935 A1 | 5/2003 | Kirmuss |
| 2003/0125854 A1 | 7/2003 | Kawasaki |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2005/0225636 A1 | 10/2005 | Maemura |
| 2005/0285938 A1 | 12/2005 | Suzuki |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0250501 A1 | 11/2006 | Wildmann et al. |
| 2006/0257140 A1 | 11/2006 | Seger |
| 2006/0290479 A1 | 12/2006 | Akatsuka et al. |
| 2007/0104476 A1 | 5/2007 | Yasutomi et al. |
| 2007/0206945 A1 * | 9/2007 | DeLorme ............... G03B 41/00 396/332 |
| 2008/0189036 A1 | 8/2008 | Elgersma |
| 2009/0002491 A1 * | 1/2009 | Haler ............... B60R 1/12 348/148 |
| 2009/0093938 A1 | 4/2009 | Isaji et al. |
| 2009/0113509 A1 | 4/2009 | Tseng et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0245223 A1 | 10/2009 | Godfrey |
| 2009/0265069 A1 | 10/2009 | Desbrunes |
| 2009/0278933 A1 * | 11/2009 | Maeda ............... G07C 5/0866 348/148 |
| 2010/0020170 A1 | 1/2010 | Higgins-Luthman et al. |
| 2010/0228437 A1 | 9/2010 | Hanzawa et al. |
| 2010/0231771 A1 | 9/2010 | Yaghmai |
| 2011/0069170 A1 | 3/2011 | Emoto |
| 2011/0193961 A1 | 8/2011 | Peterson |
| 2012/0044066 A1 | 2/2012 | Mauderer et al. |
| 2012/0062743 A1 | 3/2012 | Lynam et al. |
| 2012/0075465 A1 | 3/2012 | Wengrovitz |
| 2012/0162436 A1 * | 6/2012 | Cordell ............... G11B 27/034 348/158 |
| 2012/0188355 A1 | 7/2012 | Omi |
| 2012/0218412 A1 | 8/2012 | Dellantoni et al. |
| 2012/0262340 A1 | 10/2012 | Hassan et al. |
| 2012/0320207 A1 * | 12/2012 | Toyofuku ............... B60R 1/00 348/148 |
| 2013/0038681 A1 | 2/2013 | Osipov |
| 2013/0124052 A1 | 5/2013 | Hahne |
| 2013/0129150 A1 | 5/2013 | Saito |
| 2013/0131918 A1 | 5/2013 | Hahne |
| 2014/0067206 A1 | 3/2014 | Pflug |
| 2014/0071234 A1 * | 3/2014 | Millett ............... G01S 17/89 348/43 |
| 2014/0156157 A1 | 6/2014 | Johnson et al. |
| 2014/0222280 A1 | 8/2014 | Salomonsson |
| 2014/0313339 A1 | 10/2014 | Diessner et al. |
| 2014/0379233 A1 | 12/2014 | Chundrlik, Jr. et al. |

* cited by examiner

METHOD OF SYNCHRONIZING MULTIPLE VEHICULAR CAMERAS WITH AN ECU

CROSS REFERENCE TO RELATED APPLICATIONS

The present application is a continuation of U.S. patent application Ser. No. 15/911,442, filed Mar. 5, 2018, now U.S. Pat. No. 10,171,709, which is a continuation of U.S. patent application Ser. No. 15/338,781, filed Oct. 31, 2016, now U.S. Pat. No. 9,912,841, which is a continuation of U.S. patent application Ser. No. 14/097,581, filed Dec. 5, 2013, now U.S. Pat. No. 9,481,301, which claims the filing benefits of U.S. provisional application Ser. No. 61/733,598, filed Dec. 5, 2012, which is hereby incorporated herein by reference in its entirety.

FIELD OF THE INVENTION

The present invention relates to vehicles with cameras mounted thereon and in particular to vehicles with one or more exterior-facing cameras, such as forward facing cameras and/or sideward facing cameras and/or rearward facing cameras.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a camera for a vision system that utilizes one or more cameras or image sensors to capture image data of a scene exterior (such as forwardly) of a vehicle and provides a display of images indicative of or representative of the captured image data. The vehicle vision system automatically synchronizes a number of cameras of the vision system without changing the system architecture. The vehicle vision system powers on or initializes a camera, and starts the camera synchronous to an ECU reference timing, and then regulates the camera timing synchronous to the ECU reference timing. The system may adjust or regulate the camera or sensor between a fast mode and a slow mode depending on whether a maximum buffer level achieved during processing exceeds a selected maximum buffer threshold and whether a minimum buffer level achieved during processing is below a selected minimum buffer threshold. By adjusting the mode of the camera or sensor, the system can regulate the camera and synchronize the camera to the ECU timing.

These and other objects, advantages, purposes and features of the present invention will become apparent upon review of the following specification in conjunction with the drawings.

DETAILED DESCRIPTION OF THE INVENTION

Figure 1:
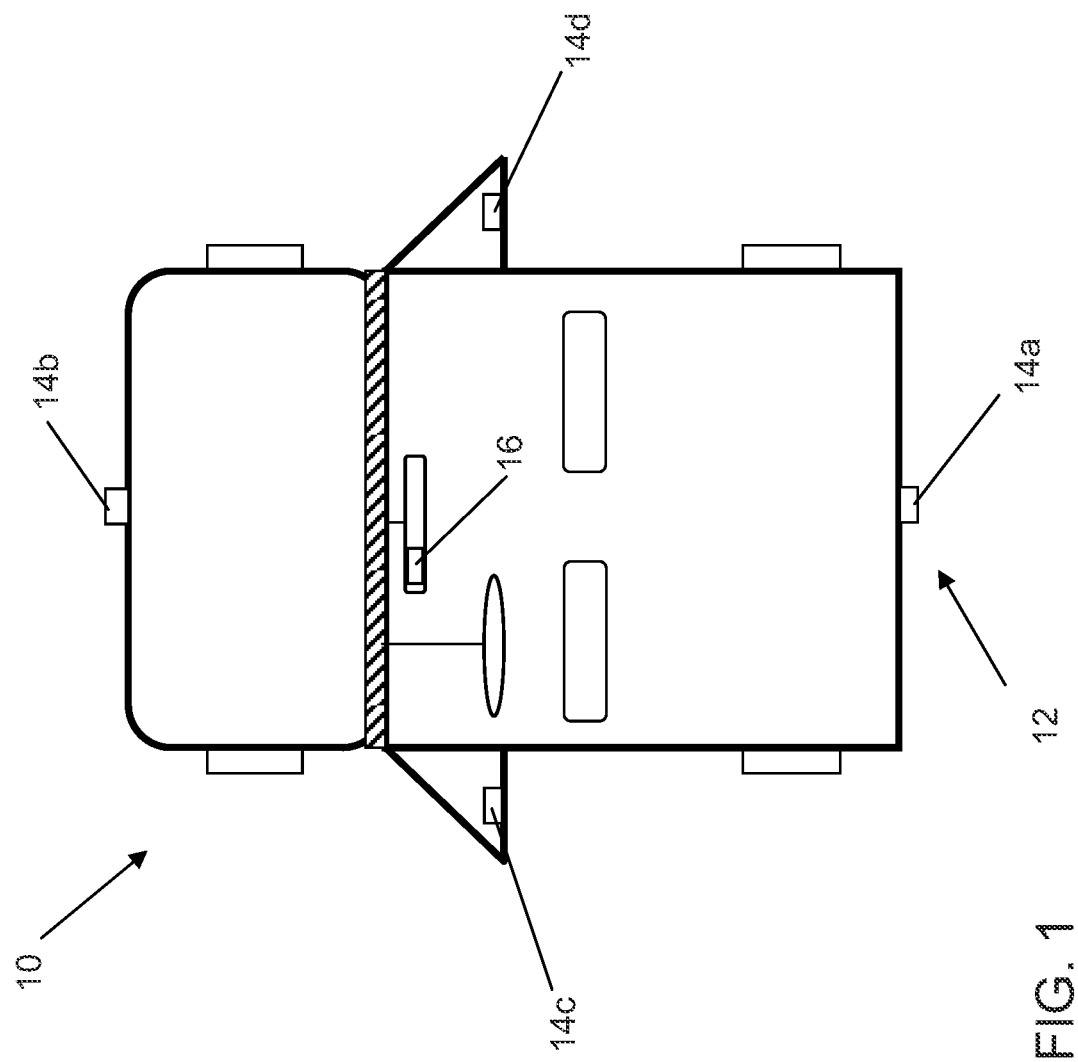
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front (or at the windshield) of the vehicle, and/or a sidewardly/rearwardly facing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

Figure 2A:
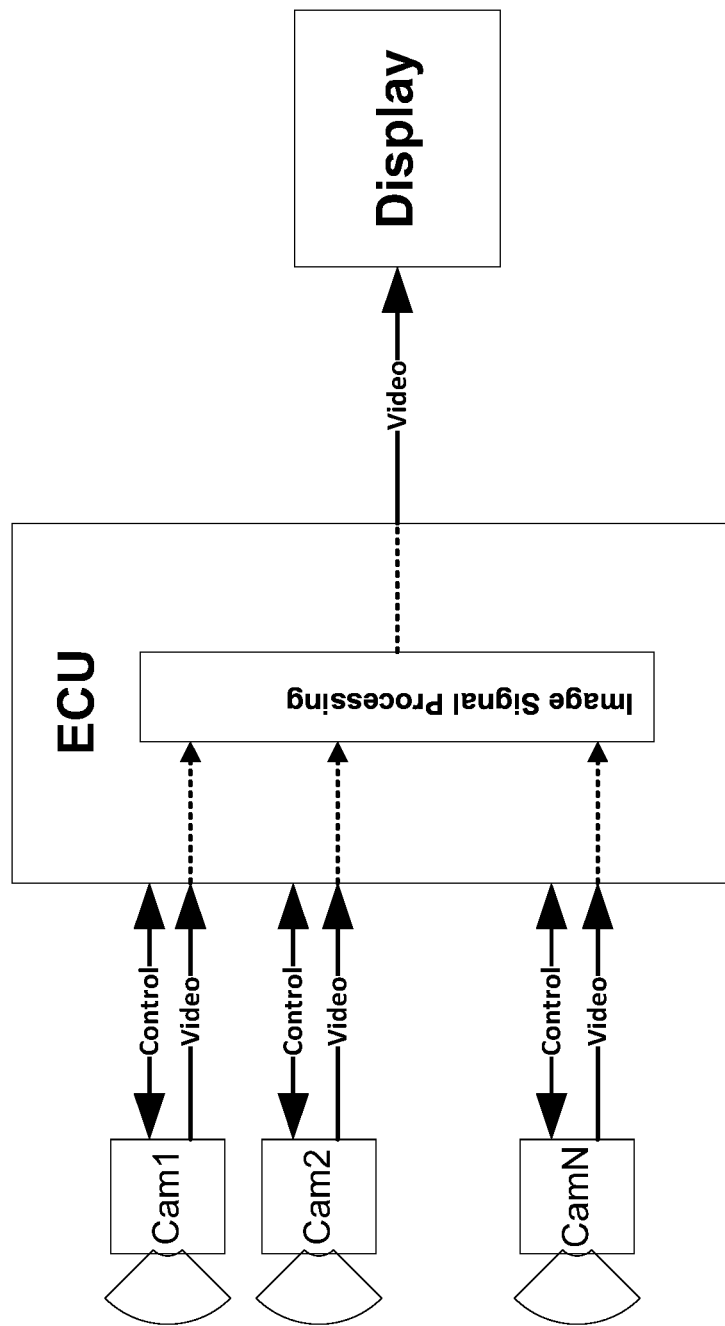
FIG. 2A is a schematic of a multi-camera system in accordance with the present invention.

General Description:

A typical multi-camera video system as shown in FIG. 2A comprises several (2 to N) satellite cameras, an electronic control unit (ECU) and a display. Typically, the satellite cameras (such as exterior facing cameras such as cameras 14a, 14b, 14c, 14d of FIG. 1) are connected via a common video interface (such as NTSC (National Television System Committee) or PAL (Phase Alternating Line) or CameraLink or LVDS or the like) and an additional control channel (CAN, LIN, UART) to the ECU. Ethernet and LVDS (Low Voltage Differential Signaling) may combine the video and the control channel over one interface. All of the mentioned interfaces are not able to distribute a common clock, generated inside the ECU, to the cameras. Therefore, all of the cameras and the ECU have their own clock sources or timing, although they normally have the same typical clock frequencies.

In such a system, it is often desired or required that the image signal processing uses images that are sensed at the same time to combine them without artifacts to the display output (particularly for generating a surround view display image based on image data captured from multiple exterior viewing cameras of the vehicle). Therefore, the sensors have to run synchronized all the time. This means their frame rates have to be substantially or exactly the same and the sensor readout has to be substantially or nearly at the same video line at a time. They thus typically run synchronously.

The present invention provides a method that allows the system to synchronize any number of cameras without changing the system architecture. Although only one camera is discussed in the description below, the description applies to all of the cameras of a multi-camera vision system because every camera of a plurality of cameras of the vehicle may be synchronized to an ECU reference timing individually.

Figure 2B:
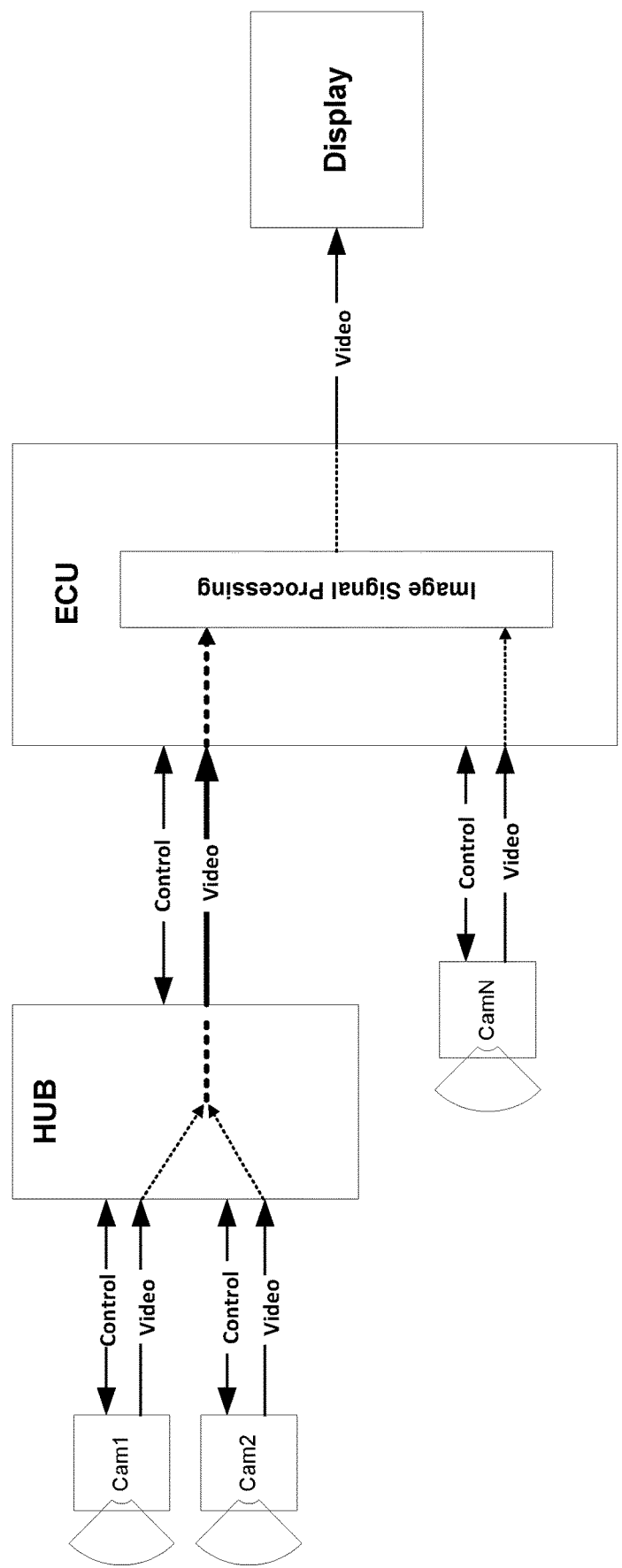
FIG. 2B is a schematic of a multi-camera system with a hub in the path of video data transmission in accordance with the present invention, with some cameras (Cam1 and Cam2) running over the hub and some cameras (CamN) connected to the ECU directly.

When running the video data over common high performance busses (such as Flexray or the like), there may be hubs instead of an ECU that the cameras are interfacing with and synchronized to. For example, see FIG. 2B, which shows a system that has some cameras (Cam1 and Cam2) connected to and interfacing with a hub (with another camera or other cameras (CamN) connected to and interfacing with the ECU directly. Although only the interfacing to an ECU is discussed in the description below, the present invention and description below applies to both a hub and an ECU as reference timing providing node to the camera or cameras.

Figure 3A:
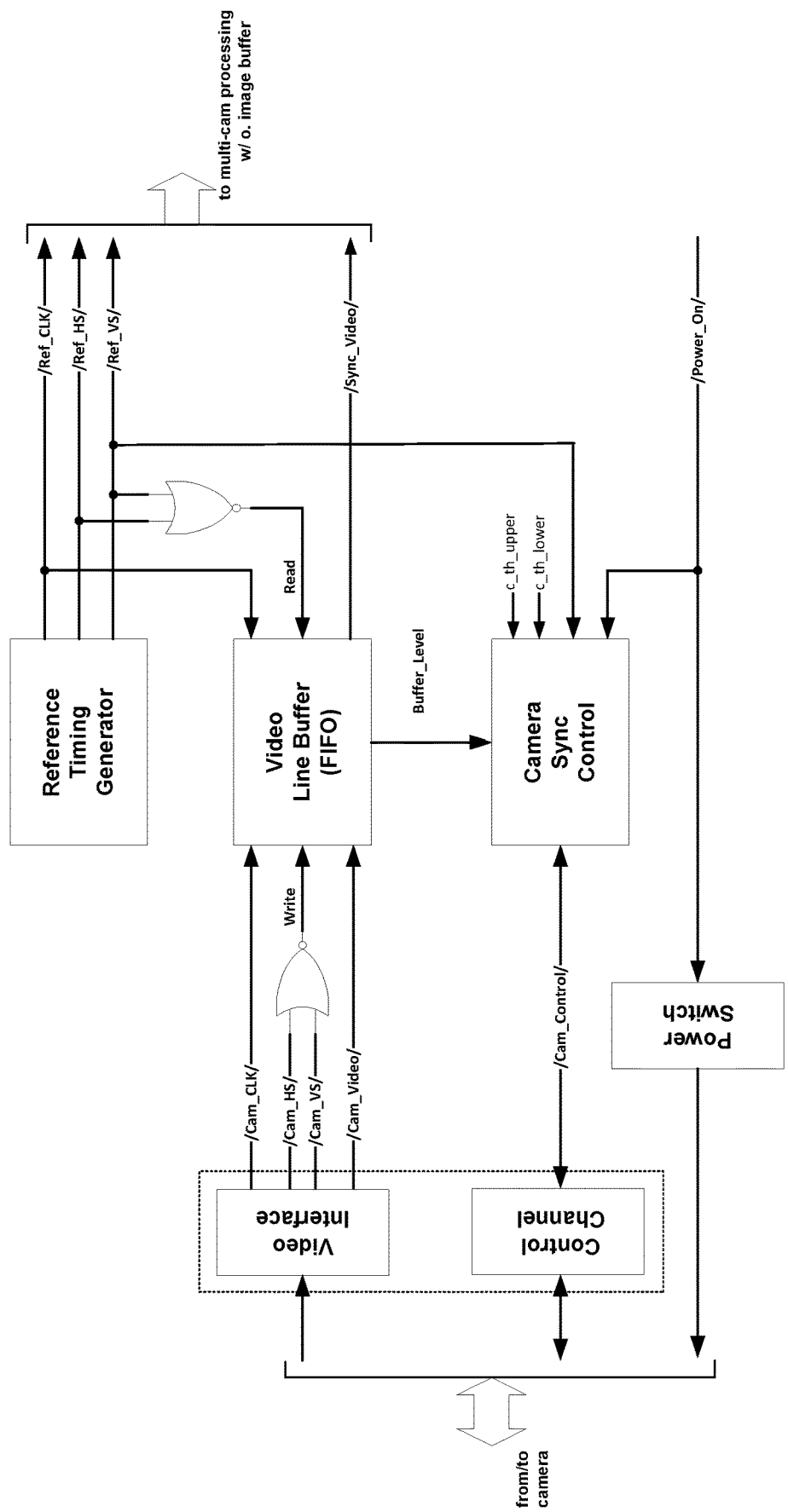
FIG. 3A is a schematic of an ECU structure of the vision system of the present invention, showing on-the-fly image processing without an image buffer, and behind the buffers the image pixels of all of the cameras are clock aligned.

ECU Entities for Synchronization:

The components for realizing the synchronization tasks in the ECU are shown in FIG. 3A. The camera video data Cam_Video is coming in to or is received by the Video Line Buffer via the Video Interface controlled by the transfer clock Cam_CLK. The side signals Cam_HS and Cam_VS are signaling the line period with blanking (horizontal timing) and frame period with blanking (vertical timing). Data is only written to the Video Line Buffer when Cam_HS and Cam_VS both do not signal a blank phase. The Video Line Buffer is organized in a FIFO (first in first out) manner, containing only the pixel data of about 1 to 2 lines or more. This depends of the clock tolerances and how fine the sensor timing can be adjusted.

The Reference Timing Generator produces the internal pixel reference clock Ref_CLK and timing signals Ref_HS and Ref_VS, which nearly have the same timing properties as the camera signals. If the reference timing signals indicate valid data, the Video Line Buffer is read. Finally, Cam_CLK, Cam_Video, Cam_HS and Cam_VS are replaced by Ref_CLK, Sync_Video, Ref_HS and Ref_VS. This at first has the effect that the camera data path is clock-synchronized to the ECU reference timing.

Then the Camera Sync Control instance has to control and ensure that the lines and frames are synchronized. This is achieved by taking care that primarily the camera is started at a well-defined time or timing point, so that the start of the first frame is written to the Video Line Buffer when the reading also starts. Secondly, the camera timing has to be programmed in a manner so that it is definitely a bit faster than the reference timing. This will lead to an increasing Buffer_level of the Video Line Buffer during the frame processing. After some frames, the Buffer_level arrives at a certain upper level threshold c_th_upper, where the camera sensor has to be adjusted to a timing, which is a bit slower than the reference timing. After this, the Buffer_level will decrease frame by frame. When the value arrives at a certain lower level threshold c_th_lower, the sensor has to be re-adjusted to the faster timing and so on. The threshold values c_th_upper and c_th_lower are constants, which have to be well determined or calculated to avoid a buffer overflow or underflow at all conditions.

Ref_VS is required to find the right start point for the camera in Camera Sync Control. A physical Power Switch on the ECU to control the camera power is not required but may be an optional element of the system. The method or system of the present invention also works if camera power is switched somewhere else, such as, for example, by the vehicle ignition or a system activation switch.

Synchronization for Image Pipeline with Image Buffer:

In the case where an image buffer is available in the image pipeline, the FIFO or buffer has to equalize only the drifts between the sensor clock and the reference clock during one line. Behind the FIFO, the image alignment still has a drift of about 1-2 lines. This will be solved at the image buffer during the vertical blank period. The main benefit of this solution is the much smaller FIFO. Optionally, the solution with the larger line buffer FIFO (FIG. 3A) may also be used in systems with an image buffer in the pipeline.

Figure 3B:
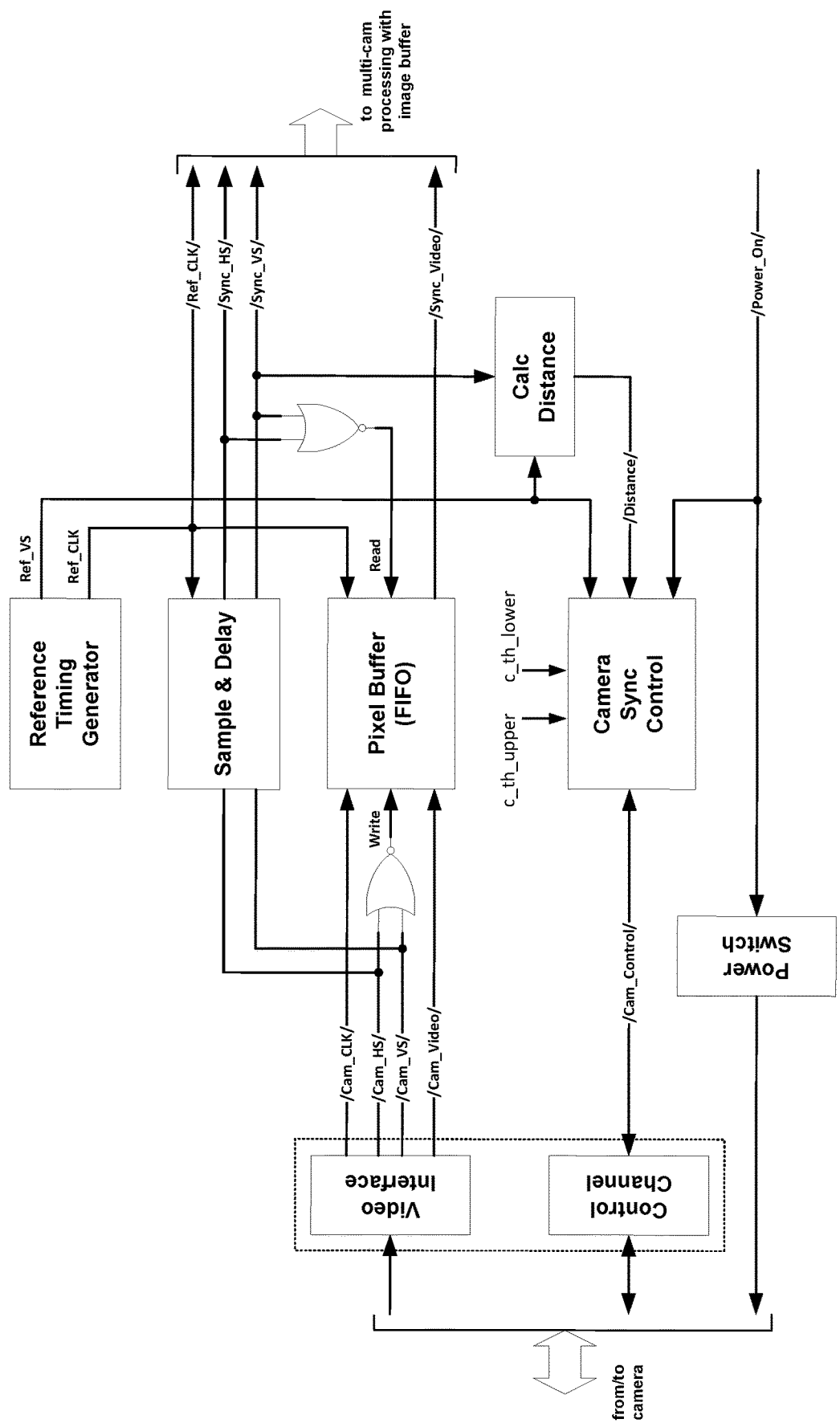
FIG. 3B is another schematic of an ECU structure of the vision system of the present invention, showing image processing with an image buffer within the pipeline.

The input structure for an ECU with an image buffer in the image pipeline is shown in FIG. 3B. In this case, the Cam_HS and Cam_VS signals are just sampled to the reference clock Ref_CLK and delayed by some clock period or time period. The delay has to be realized in a manner that the active periods of the lines are conserved. During the blank phases, the FIFO is always empty. When a line starts, it is written from the camera side. Optionally, and desirably, when it is filled about half way, the reading also starts. The difference to the solution in FIG. 3A is that Sync_HS and Sync_VS in the system of FIG. 3B are still dependent from the sensor timing and therefore exist in parallel for each camera like Sync_Video. The Camera Sync Control is the same in both systems. Instead of the buffer level, there is calculated (in the system of FIG. 3B) the distance in clock cycles between the start of frame (SOF) of the Reference Timing at Ref_VS and the SOF of the sensor timing at Sync_VS. This is the task of the Calc_Distance block.

Camera Sync Control—Main Tasks:

To achieve a multi-camera system running synchronously in accordance with the present invention, two tasks are performed:

1) Start the camera synchronous to the ECU reference timing; and
2) Hold (regulate) the camera timing synchronous to the ECU timing.

Figure 4:
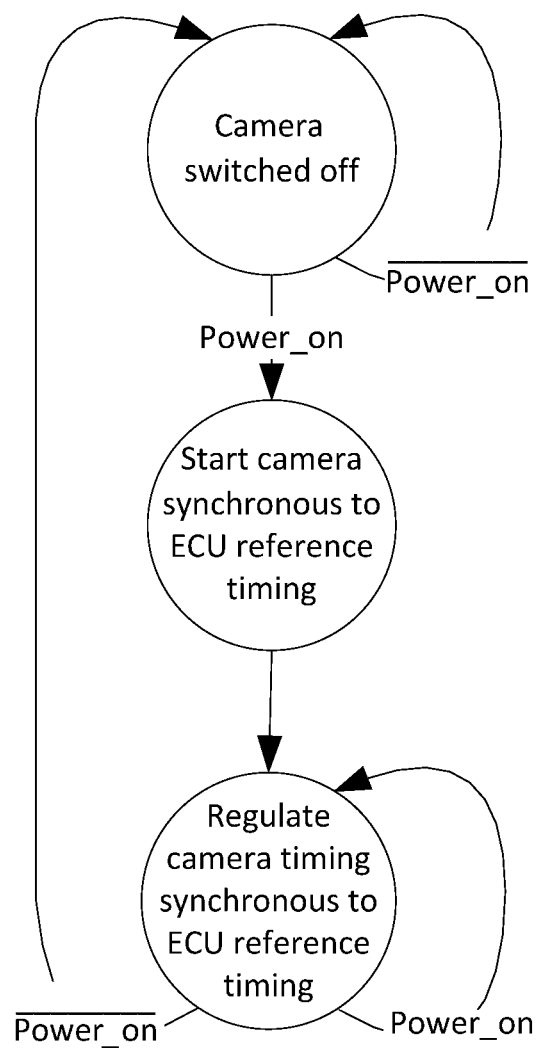
FIG. 4 is a flow chart showing the synchronization main states of the present invention.

FIG. 4 shows the main tasks in a state-machine depending of the camera power (POWER_on).

Figure 5A:
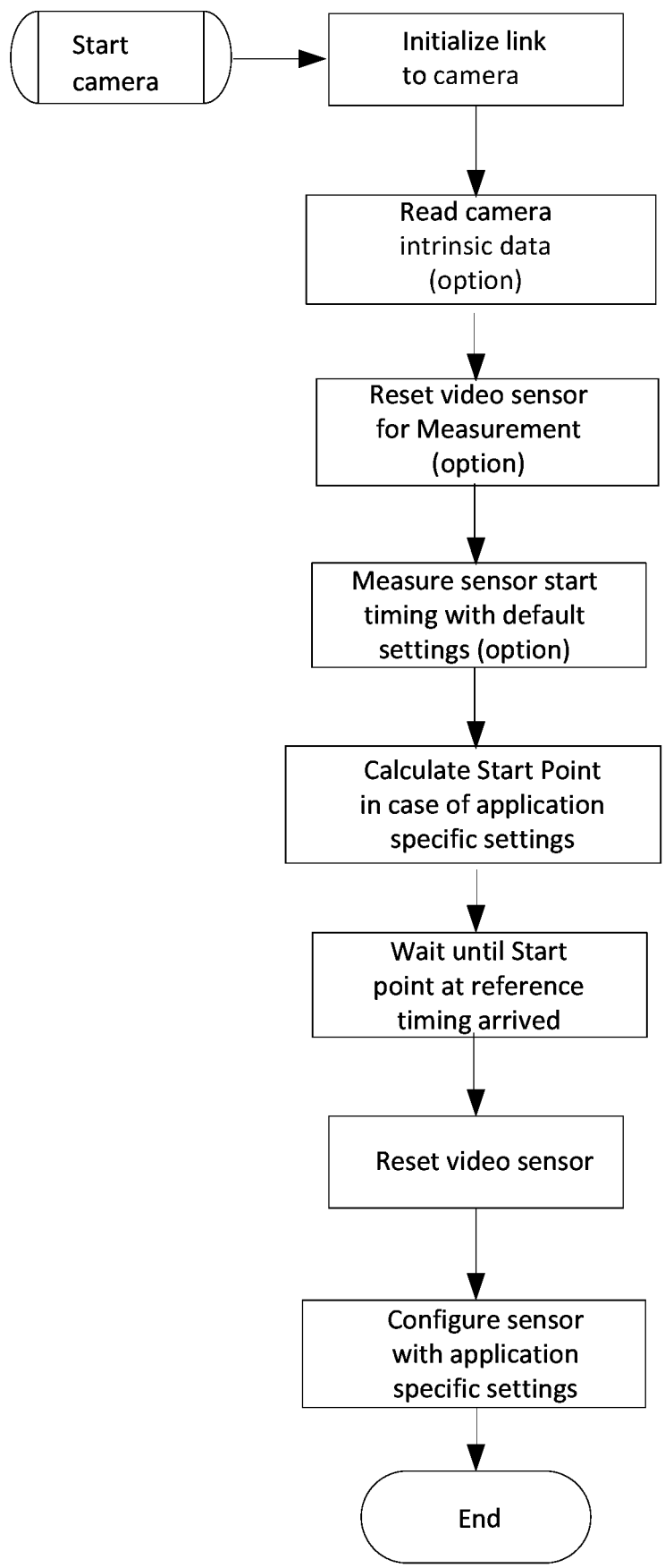
FIG. 5A is a flow chart of a smart camera operation in accordance with the present invention, showing a sequence when starting from reset.

Start Camera from Reset Task:

A flowchart of the start camera task is shown in FIG. 5A. After starting or powering-on a camera, the link from ECU to camera is initialized, regardless of which interface technology is used. After the link is initialized, a communication to the camera sensor and optional parts such as, for example, an EEPROM or the like, is established.

The EEPROM may contain production and calibration data, which is often named intrinsic data. This camera intrinsic data should be read next, because later-on it may be more time consuming or complicated.

If the startup time of the sensor is varying from part to part, it may be helpful to measure individual behavior and adjust the start point individually. A good period to measure is reset to the start of frame (SOF) or reset to the end of frame (EOF). If this is likely constant, the measurement step with its reset before can be left-out.

At the end, the sensor has to be reconfigured for application specific needs. The startup time from the sensor, in that case, is different from the startup time with default values after the reset. However, the difference of these two times will be constant for all parts. With knowledge of that time difference or delta time and under consideration of known or selected tolerances, the starting point related to the ECU reference Ref_VS can be calculated, so that the sensor will start its first frame slightly before the ECU wants to read it from the FIFO. The start point is then awaited after the triggering edge of Ref_VS.

The startup of the sensor is initiated with a reset. This can be done either via hardware (HW), such as by pin toggling or the like, or via software (SW), such as by sending a command or the like. Then the application specific configurations are sent to the sensor, where at its end the sensor has the correct frame timing. At the end of this task, the sensor's start of its first frame will be synchronous with or synchronized to the ECU reference timing and first read.

Figure 5B:
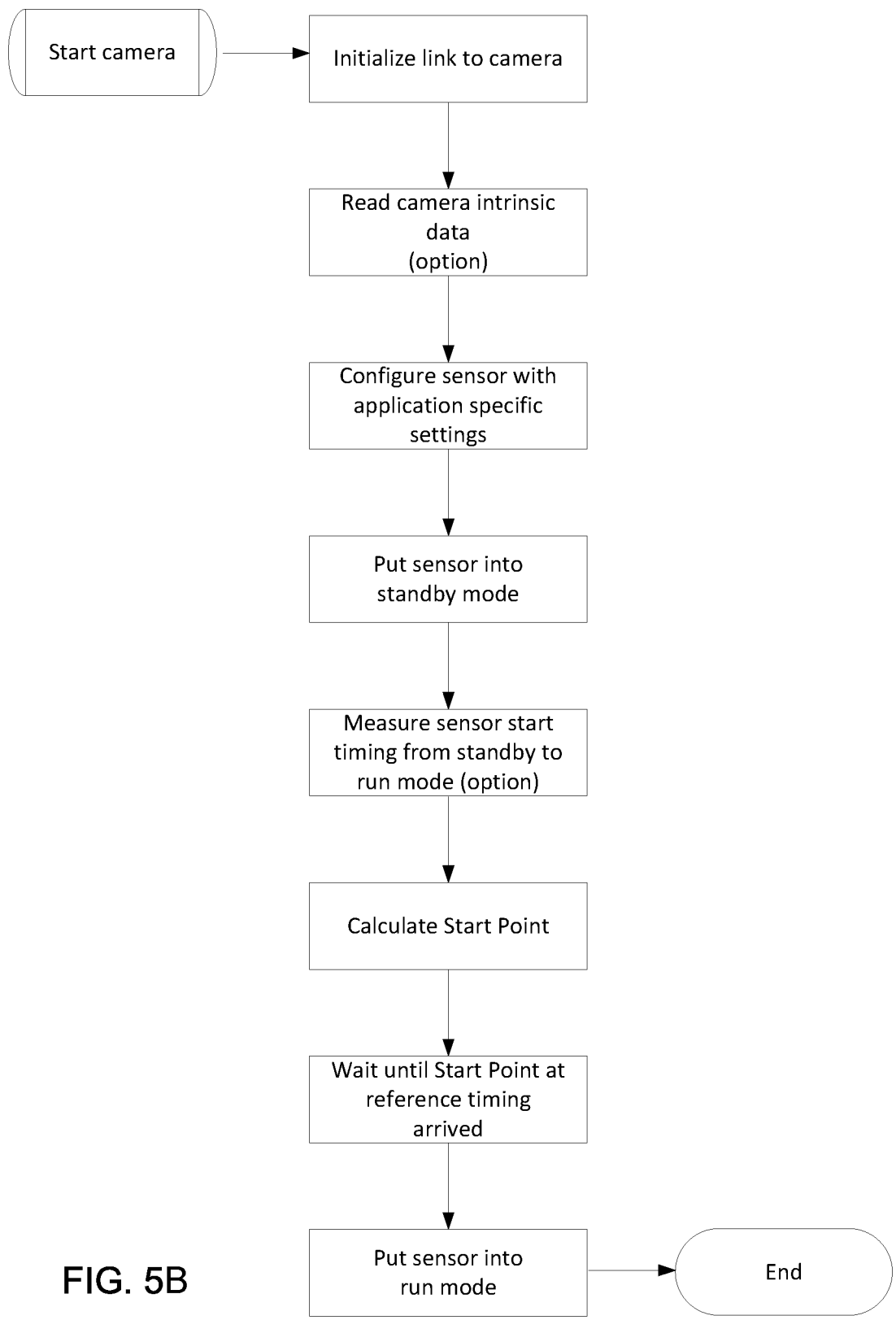
FIG. 5B is a flow chart of a smart camera operation in accordance with the present invention, showing a sequence when starting from standby.

Start Camera from Standby Task:

A flowchart of the start camera task is shown in FIG. 5B. After starting or powering-on a camera, the link from ECU to camera is initialized, regardless of which interface technology is used. After that, a communication to the camera sensor and optional parts, such as, for example, an EEPROM or the like, is established.

The EEPROM may contain production and calibration data, which is often named intrinsic data. This data should be read next, because later-on it may be more time consuming or complicated to accomplish.

Optionally, the sensor may be configured with application specific settings or application specific settings may be loaded into the sensor.

After that, the sensor has to be put into the standby mode where the application specific settings may not be lost. The sensor start timing from standby to run mode may then be measured. If the startup time of the sensor is varying from part to part, it may be helpful to measure individual behavior and adjust the start point individually. A good period to measure is run to start of frame (SOF) or run to end of frame (EOF). If this is likely constant, the measurement step can be left-out.

Then the calculation of the starting point takes place which is related to the ECU reference Ref_VS, so that at the end the sensor will start this first frame slightly before the ECU wants to read it from the FIFO.

The start point is then awaited relating to the triggering edge of Ref_VS and the startup of the sensor is initiated by setting the sensor into run mode. At the end of this task, the sensor's start of first frame will be synchronous to the ECU reference timing and first read.

Figure 6:
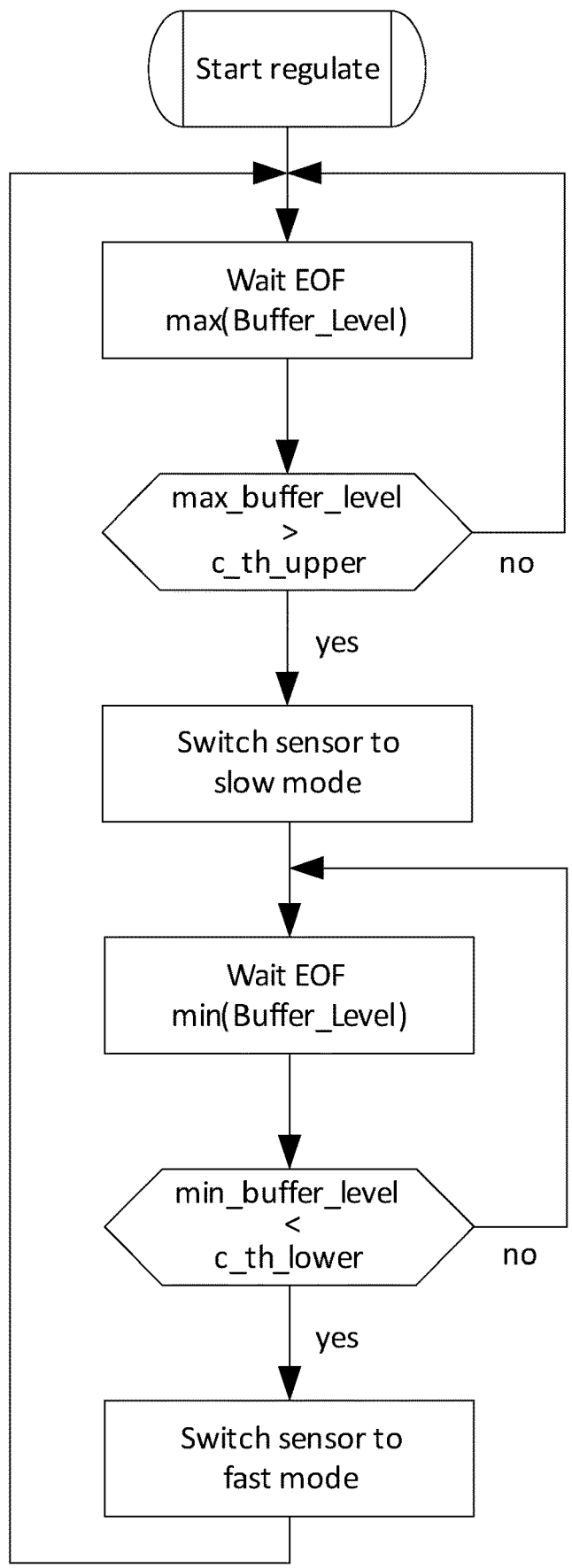
FIG. 6 is a flow chart of a regulation of the smart camera of the vision system of the present invention.

Regulation Task:

A flowchart of the regulation task is shown in FIG. 6. Buffer_Level from FIG. 3A and Distance from FIG. 3B have the same meaning for the Regulation Task. The regulation task is a repeating process started once. As described before, the sensor is normally operating a bit faster than the ECU reference timing. This is the fast mode.

While the end of frame (EOF) is awaited, that system saves the maximum occurred Buffer_Level in fast mode to max_buffer_level. After the end of frame (EOF), the max_buffer_level is compared to the c_th_upper threshold. If the max buffer level is not greater than the c_th_upper threshold, then the buffer takes no risk to overflow in the next frame and the sensor can continue in fast mode.

Otherwise, if the max buffer level is greater than the c_th_upper threshold, the sensor timing is switched to the slow mode. This is done during the vertical blanking period before the start of frame (SOF).

While the end of frame is awaited, the system saves the minimum occurred Buffer_Level in the slow mode to min_buffer_level. After EOF, the min_buffer_level is compared to the c_th_lower threshold. If the minimum buffer level is not smaller than the c_th_lower threshold, then the buffer takes no risk to underflow in the next frame and the sensor can continue in slow mode. Otherwise, if the minimum buffer level is smaller than the threshold, the sensor timing is switched to the fast mode. This is done during the vertical blanking period before SOF. The regulation task then restarts again.

Optionally, the regulation task may also operate well if the min_buffer_level is not calculated and checked. In such an application, the fast mode follows one frame period of slow mode automatically. This depends on the adjustment granularity of the sensor and the system design.

Switching Sensor Timing:

In principle, there are two possibilities to slow down the sensor timing. A first option is to add an additional blank line. This enlarges the frame period by one line period. However, if the sensor has a rolling shutter, this method won't work, because it may conflict with the exposure control.

A second and preferred option is to add blank pixels to the lines. In this case the frame period enlarges by the number of lines multiplied with the added pixels per row. In this case, the exposure control is also influenced, but in a much smoother way, which cannot be recognized by the viewer viewing displayed images captured by the imager and displayed on a display.

Therefore, the present invention provides a system that automatically synchronizes a number of cameras of a vehicle vision system without changing the system architecture. The system of the present invention powers on or initializes a camera, and starts the camera synchronous to an ECU reference timing, and then regulates the camera timing synchronous to the ECU reference timing. The system may adjust or regulate the camera or sensor between a fast mode and a slow mode depending on whether a maximum buffer level achieved during processing exceeds a selected maximum buffer threshold and whether a minimum buffer level achieved during processing is below a selected minimum buffer threshold. By adjusting the mode of the camera or sensor, the system can regulate the camera and synchronize the camera to the ECU timing.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (preferably a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577;

6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/103193; WO 2012/0116043; WO 2012/0145501; WO 2012/0145343; WO 2012/154919; WO 2013/019707; WO 2013/016409; WO 2012/145822; WO 2013/067083; WO 2013/070539; WO 2013/043661; WO 2013/048994; WO 2013/063014; WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or U.S. patent applications, Ser. No. 14/082,573, filed Nov. 18, 2013 and published May 22, 2014 as U.S. Publication No. US-2014-0139676; Ser. No. 14/082,574, filed Nov. 18, 2013 and published May 22, 2014 as U.S. Publication No. US-2014-0138140; Ser. No. 14/082,575, filed Nov. 18, 2013 and published Jun. 5, 2014 as U.S. Publication No. US-2014-0156157; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013 and published Apr. 17, 2014 as U.S. Publication No. US-2014-0104426; Ser. No. 14/046,174, filed Oct. 4, 2013 and published Apr. 10, 2014 as U.S. Publication No. US-2014-0098229; Ser. No. 14/016,790, filed Oct. 3, 2013 and published Mar. 6, 2014 as U.S. Publication No. US-2014-0067206; Ser. No. 14/036,723, filed Sep. 25, 2013, now U.S. Pat. No. 9,446,713; Ser. No. 14/016,790, filed Sep. 3, 2013 and published Mar. 6, 2014 as U.S. Publication No. US-2014-0067206; Ser. No. 14/001,272, filed Aug. 23, 2013, now U.S. Pat. No. 9,233,641; Ser. No. 13/970,868, filed Aug. 20, 2013 and published Feb. 20, 2014 as U.S. Publication No. US-2014-0049646; Ser. No. 13/964,134, filed Aug. 12, 2013 and published Feb. 20, 2014 as U.S. Publication No. US-2014-0052340; Ser. No. 13/942,758, filed Jul. 16, 2013 and published Jan. 23, 2014 as U.S. Publication No. US-2014-0025240; Ser. No. 13/942,753, filed Jul. 16, 2013 and published Jan. 30, 2014 as U.S. Publication No. US-2014-0028852; Ser. No. 13/927,680, filed Jun. 26, 2013 and published Jan. 2, 2014 as U.S. Publication No. US-2014-0005907; Ser. No. 13/916,051, filed Jun. 12, 2013, now U.S. Pat. No. 9,077,098; Ser. No. 13/894,870, filed May 15, 2013 and published Nov. 28, 2013 as U.S. Publication No. US-2013-0314503; Ser. No. 13/887,724, filed May 6, 2013 and published Nov. 14, 2013 as U.S. Publication No. US-2013-0298866; Ser. No. 13/852,190, filed Mar. 28, 2013 and published Aug. 29, 2013 as U.S. Publication No. US-2013-0222593; Ser. No. 13/851,378, filed Mar. 27, 2013 and published Nov. 14, 2013 as U.S. Publication No. US-2013-0300869; Ser. No. 13/848,796, filed Mar. 22, 2012 and published Oct. 24, 2013 as U.S. Publication No. US-2013-0278769; Ser. No. 13/847,815, filed Mar. 20, 2013 and published Oct. 31, 2013 as U.S. Publication No. US-2013-0286193; Ser. No. 13/800,697, filed Mar. 13, 2013 and published Oct. 3, 2013 as U.S. Publication No. US-2013-0258077; Ser. No. 13/785,099, filed Mar. 5, 2013 and published Sep. 19, 2013 as U.S. Publication No. US-2013-0242099; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013 and published Aug. 22, 2013 as U.S. Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574, and/or Ser. No. 13/534,657, filed Jun. 27, 2012 and published Jan. 3, 2013 as U.S. Publication No. US-2013-0002873, and/or U.S. provisional applications, Ser. No. 61/901,127, filed Nov. 7, 2013; Ser. No. 61/905,461, filed Nov. 18, 2013; Ser. No. 61/905,462, filed Nov. 18, 2013; Ser. No. 61/895,610, filed Oct. 25, 2013; Ser. No. 61/895,609, filed Oct. 25, 2013; Ser. No. 61/893,489, filed Oct. 21, 2013; Ser. No. 61/886,883, filed Oct. 4, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013; Ser. No. 61/793,592, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/770,048, filed Feb. 27, 2013; Ser. No. 61/766,883, filed Feb. 20, 2013; Ser. No. 61/760,366, filed Feb. 4, 2013; Ser. No. 61/760,364, filed Feb. 4, 2013; Ser. No. 61/756,832, filed Jan. 25, 2013; Ser. No. 61/754,804, filed Jan. 21, 2013; Ser. No. 61/736,104, filed Dec. 12, 2012; Ser. No. 61/736,103, filed Dec. 12, 2012; Ser. No. 61/734,457, filed Dec. 7, 2012, and/or Ser. No. 61/733,093, filed Dec. 4, 2012, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No.

WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012 and published Jan. 31, 2013 as International Publication No. WO 2013/016409, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent applications, Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149, and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent applications, Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008, and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the above description constitutes a plurality of embodiments of the present invention, it will be appreciated that the present invention is susceptible to further modification and change without departing from the fair meaning of the accompanying claims.

The invention claimed is:
1. A method of synchronizing cameras with an electronic control unit of a vehicular vision system, said method comprising:
providing a plurality of cameras at a vehicle equipped with the vehicular vision system, wherein the plurality of cameras comprises at least a first camera, a second camera, a third camera and a fourth camera;
wherein providing the plurality of cameras comprises providing the first camera at a front portion of the equipped vehicle, providing the second camera at a left-side side portion of the equipped vehicle, providing the third camera at a right-side side portion of the equipped vehicle, and providing the fourth camera at a rear portion of the equipped vehicle;
wherein each of the first camera, the second camera, the third camera and the fourth camera, when provided at the equipped vehicle, has a respective field of view exterior of the equipped vehicle;
providing an electronic control unit (ECU) at the equipped vehicle;
providing a first camera control signal to the first camera from the ECU via a first link from the ECU to the first camera, wherein the first camera control signal regulates timing of the first camera to be synchronous with reference timing of the ECU;
providing a second camera control signal to the second camera from the ECU via a second link from the ECU to the second camera, wherein the second camera control signal regulates timing of the second camera to be synchronous with reference timing of the ECU;
providing a third camera control signal to the third camera from the ECU via a third link from the ECU to the third camera, wherein the third camera control signal regulates timing of the third camera to be synchronous with reference timing of the ECU;
providing a fourth camera control signal to the fourth camera from the ECU via a fourth link from the ECU to the fourth camera, wherein the fourth camera control signal regulates timing of the fourth camera to be synchronous with reference timing of the ECU;
regulating timing of the first camera via starting the first camera synchronous to the ECU reference timing and holding the first camera synchronous to the ECU reference timing;
regulating timing of the second camera via starting the second camera synchronous to the ECU reference timing and holding the second camera synchronous to the ECU reference timing;
regulating timing of the third camera via starting the third camera synchronous to the ECU reference timing and holding the third camera synchronous to the ECU reference timing;
regulating timing of the fourth camera via starting the fourth camera synchronous to the ECU reference timing and holding the fourth camera synchronous to the ECU reference timing;
capturing frames of image data with each of the first camera, the second camera, the third camera and the fourth camera;
providing image data captured by the first camera to the ECU via the first link from the first camera to the ECU;
providing image data captured by the second camera to the ECU via the second link from the second camera to the ECU;
providing image data captured by the third camera to the ECU via the third link from the third camera to the ECU; and providing image data captured by the fourth camera to the ECU via the fourth link from the fourth camera to the ECU.

2. The method of claim 1, comprising (i) providing at least one other camera control signal from the ECU to the first camera via the first link, (ii) providing at least one other camera control signal from the ECU to the second camera via the second link, (iii) providing at least one other camera control signal from the ECU to the third camera via the third link and (iv) providing at least one other camera control signal from the ECU to the fourth camera via the fourth link.

3. The method of claim 1, comprising processing, at the ECU, image data captured by at least one of the first camera, the second camera, the third camera and the fourth camera to detect an object present exterior of the equipped vehicle.

4. The method of claim 3, wherein the object present exterior of the equipped vehicle is exterior a side of the equipped vehicle.

5. The method of claim 4, wherein the object present exterior the side of the equipped vehicle comprises a vehicle that is approaching the equipped vehicle.

6. The method of claim 5, wherein the vehicle that is approaching the equipped vehicle is traveling in a traffic lane adjacent to a traffic lane in which the equipped vehicle is traveling.

7. The method of claim 3, wherein the object present exterior of the equipped vehicle is to the rear of the equipped vehicle and is detected during a reversing maneuver of the equipped vehicle.

8. The method of claim 1, wherein the first camera, the second camera, the third camera and the fourth camera are part of a surround vision system of the equipped vehicle.

9. The method of claim 8, comprising (i) processing, at the ECU, image data captured by at least one of the first camera, the second camera, the third camera and the fourth camera, and (ii) outputting, via the ECU, and responsive at least in part to the processing, images for display at a display device of the equipped vehicle for viewing by an occupant of the equipped vehicle.

10. The method of claim 9, wherein the displayed images comprise birds-eye view images generated by said surround vision system.

11. The method of claim 1, wherein the first camera comprises a first megapixel imaging array having at least one million photosensing elements arranged in columns and rows of photosensing elements, and wherein the second camera comprises a second megapixel imaging array having at least one million photosensing elements arranged in columns and rows of photosensing elements, and wherein the third camera comprises a third megapixel imaging array having at least one million photosensing elements arranged in columns and rows of photosensing elements, and wherein the fourth camera comprises a fourth megapixel imaging array having at least one million photosensing elements arranged in columns and rows of photosensing elements.

12. The method of claim 1, comprising, upon powering the first, second, third and fourth cameras, initializing the first, second, third and fourth links to establish communication with the respective first, second, third and fourth cameras.

13. The method of claim 12, wherein the established communication at least comprises first, second, third, and fourth camera calibration data for the respective first, second, third, and fourth cameras.

14. A method of synchronizing cameras with an electronic control unit of a vehicular vision system, said method comprising:

providing a plurality of cameras at a vehicle equipped with the vehicular vision system, wherein the plurality of cameras comprises at least a first camera, a second camera, a third camera and a fourth camera;

wherein the first camera comprises a first megapixel imaging array having at least one million photosensing elements arranged in columns and rows of photosensing elements, and wherein the second camera comprises a second megapixel imaging array having at least one million photosensing elements arranged in columns and rows of photosensing elements, and wherein the third camera comprises a third megapixel imaging array having at least one million photosensing elements arranged in columns and rows of photosensing elements, and wherein the fourth camera comprises a fourth megapixel imaging array having at least one million photosensing elements arranged in columns and rows of photosensing elements;

wherein providing the plurality of cameras comprises providing the first camera at a front portion of the equipped vehicle, providing the second camera at a left-side side portion of the equipped vehicle, providing the third camera at a right-side side portion of the equipped vehicle, and providing the fourth camera at a rear portion of the equipped vehicle;

wherein each of the first camera, the second camera, the third camera and the fourth camera, when provided at the equipped vehicle, has a respective field of view exterior of the equipped vehicle;

providing an electronic control unit (ECU) at the equipped vehicle;

providing a first camera control signal to the first camera from the ECU via a first link from the ECU to the first camera, wherein the first camera control signal regulates timing of the first camera to be synchronous with reference timing of the ECU;

providing a second camera control signal to the second camera from the ECU via a second link from the ECU to the second camera, wherein the second camera control signal regulates timing of the second camera to be synchronous with reference timing of the ECU;

providing a third camera control signal to the third camera from the ECU via a third link from the ECU to the third camera, wherein the third camera control signal regulates timing of the third camera to be synchronous with reference timing of the ECU;

providing a fourth camera control signal to the fourth camera from the ECU via a fourth link from the ECU to the fourth camera, wherein the fourth camera control signal regulates timing of the fourth camera to be synchronous with reference timing of the ECU;

regulating timing of the first camera via starting the first camera synchronous to the ECU reference timing and holding the first camera synchronous to the ECU reference timing;

regulating timing of the second camera via starting the second camera synchronous to the ECU reference timing and holding the second camera synchronous to the ECU reference timing;

regulating timing of the third camera via starting the third camera synchronous to the ECU reference timing and holding the third camera synchronous to the ECU reference timing;

regulating timing of the fourth camera via starting the fourth camera synchronous to the ECU reference timing and holding the fourth camera synchronous to the ECU reference timing;

providing at least one other camera control signal from the ECU to the first camera via the first link;
providing at least one other camera control signal from the ECU to the second camera via the second link;
providing at least one other camera control signal from the ECU to the third camera via the third link;
providing at least one other camera control signal from the ECU to the fourth camera via the fourth link;
capturing frames of image data with each of the first camera, the second camera, the third camera and the fourth camera;
providing image data captured by the first camera to the ECU via the first link from the first camera to the ECU;
providing image data captured by the second camera to the ECU via the second link from the second camera to the ECU;
providing image data captured by the third camera to the ECU via the third link from the third camera to the ECU;
providing image data captured by the fourth camera to the ECU via the fourth link from the fourth camera to the ECU; and
processing, at the ECU, image data captured by at least one of the first camera, the second camera, the third camera and the fourth camera to detect an object present exterior of the equipped vehicle.

15. The method of claim 14, wherein the object present exterior of the equipped vehicle is exterior a side of the equipped vehicle.

16. The method of claim 15, wherein the object present exterior the side of the equipped vehicle comprises a vehicle that is approaching the equipped vehicle.

17. The method of claim 16, wherein the vehicle that is approaching the equipped vehicle is traveling in a traffic lane adjacent to a traffic lane in which the equipped vehicle is traveling.

18. The method of claim 14, wherein the object present exterior of the equipped vehicle is to the rear of the equipped vehicle and is detected during a reversing maneuver of the equipped vehicle.

19. The method of claim 14, wherein the first camera, the second camera, the third camera and the fourth camera are part of a surround vision system of the equipped vehicle.

20. The method of claim 19, comprising (i) processing, at the ECU, image data captured by at least one of the first camera, the second camera, the third camera and the fourth camera, and (ii) outputting, via the ECU, and responsive at least in part to the processing, images for display at a display device of the equipped vehicle for viewing by an occupant of the equipped vehicle.

21. The method of claim 20, wherein the displayed images comprise birds-eye view images generated by said surround vision system.

22. The method of claim 14, comprising, upon powering the first, second, third and fourth cameras, initializing the first, second, third and fourth links to establish communication with the respective first, second, third and fourth cameras.

23. The method of claim 22, wherein the established communication at least comprises first, second, third, and fourth camera calibration data for the respective first, second, third, and fourth cameras.

24. A method of synchronizing cameras with an electronic control unit of a vehicular vision system, said method comprising:
providing a plurality of cameras at a vehicle equipped with the vehicular vision system, wherein the plurality of cameras comprises at least a first camera, a second camera, a third camera and a fourth camera;
wherein the first camera comprises a first megapixel imaging array having at least one million photosensing elements arranged in columns and rows of photosensing elements, and wherein the second camera comprises a second megapixel imaging array having at least one million photosensing elements arranged in columns and rows of photosensing elements, and wherein the third camera comprises a third megapixel imaging array having at least one million photosensing elements arranged in columns and rows of photosensing elements, and wherein the fourth camera comprises a fourth megapixel imaging array having at least one million photosensing elements arranged in columns and rows of photosensing elements;
wherein providing the plurality of cameras comprises providing the first camera at a front portion of the equipped vehicle, providing the second camera at a left-side side portion of the equipped vehicle, providing the third camera at a right-side side portion of the equipped vehicle, and providing the fourth camera at a rear portion of the equipped vehicle;
wherein each of the first camera, the second camera, the third camera and the fourth camera, when provided at the equipped vehicle, has a respective field of view exterior of the equipped vehicle;
providing an electronic control unit (ECU) at the equipped vehicle;
providing a first link between the ECU and the first camera;
providing a second link between the ECU and the second camera;
providing a third link between the ECU and the third camera;
providing a fourth link between the ECU and the fourth camera;
upon powering the first, second, third and fourth cameras, initializing the first, second, third and fourth links to establish communication with the respective first, second, third and fourth cameras;
providing a first camera control signal to the first camera from the ECU via the first link from the ECU to the first camera, wherein the first camera control signal regulates timing of the first camera to be synchronous with reference timing of the ECU;
providing a second camera control signal to the second camera from the ECU via the second link from the ECU to the second camera, wherein the second camera control signal regulates timing of the second camera to be synchronous with reference timing of the ECU;
providing a third camera control signal to the third camera from the ECU via the third link from the ECU to the third camera, wherein the third camera control signal regulates timing of the third camera to be synchronous with reference timing of the ECU;
providing a fourth camera control signal to the fourth camera from the ECU via the fourth link from the ECU to the fourth camera, wherein the fourth camera control signal regulates timing of the fourth camera to be synchronous with reference timing of the ECU;
regulating timing of the first camera via starting the first camera synchronous to the ECU reference timing and holding the first camera synchronous to the ECU reference timing;

regulating timing of the second camera via starting the second camera synchronous to the ECU reference timing and holding the second camera synchronous to the ECU reference timing;

regulating timing of the third camera via starting the third camera synchronous to the ECU reference timing and holding the third camera synchronous to the ECU reference timing;

regulating timing of the fourth camera via starting the fourth camera synchronous to the ECU reference timing and holding the fourth camera synchronous to the ECU reference timing;

capturing frames of image data with each of the first camera, the second camera, the third camera and the fourth camera;

providing image data captured by the first camera to the ECU via the first link from the first camera to the ECU;

providing image data captured by the second camera to the ECU via the second link from the second camera to the ECU;

providing image data captured by the third camera to the ECU via the third link from the third camera to the ECU; and providing image data captured by the fourth camera to the ECU via the fourth link from the fourth camera to the ECU.

25. The method of claim 24, wherein the established communication at least comprises first, second, third, and fourth camera calibration data for the respective first, second, third, and fourth cameras.

26. The method of claim 24, comprising (i) providing at least one other camera control signal from the ECU to the first camera via the first link, (ii) providing at least one other camera control signal from the ECU to the second camera via the second link, (iii) providing at least one other camera control signal from the ECU to the third camera via the third link and (iv) providing at least one other camera control signal from the ECU to the fourth camera via the fourth link.

27. The method of claim 24, comprising processing, at the ECU, image data captured by at least one of the first camera, the second camera, the third camera and the fourth camera to detect an object present exterior of the equipped vehicle.

28. The method of claim 27, wherein the object present exterior of the equipped vehicle is exterior a side of the equipped vehicle.

29. The method of claim 28, wherein the object present exterior the side of the equipped vehicle comprises a vehicle that is approaching the equipped vehicle.

30. The method of claim 29, wherein the vehicle that is approaching the equipped vehicle is traveling in a traffic lane adjacent to a traffic lane in which the equipped vehicle is traveling.

31. The method of claim 27, wherein the object present exterior of the equipped vehicle is to the rear of the equipped vehicle and is detected during a reversing maneuver of the equipped vehicle.

32. The method of claim 24, wherein the first camera, the second camera, the third camera and the fourth camera are part of a surround vision system of the equipped vehicle.

33. The method of claim 32, comprising (i) processing, at the ECU, image data captured by at least one of the first camera, the second camera, the third camera and the fourth camera, and (ii) outputting, via the ECU, and responsive at least in part to the processing, images for display at a display device of the equipped vehicle for viewing by an occupant of the equipped vehicle.

34. The method of claim 33, wherein the displayed images comprise birds-eye view images generated by said surround vision system.

* * * * *